(12) United States Patent
Itoh et al.

(10) Patent No.: US 10,519,812 B2
(45) Date of Patent: Dec. 31, 2019

(54) TURBINE

(71) Applicant: Honda Motor Co.,Ltd., Tokyo (JP)

(72) Inventors: Naoki Itoh, Saitama (JP); Naoki Kuno, Saitama (JP); Takashi Sakakibara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 300 days.

(21) Appl. No.: 15/618,137

(22) Filed: Jun. 9, 2017

(65) Prior Publication Data

US 2017/0370249 A1 Dec. 28, 2017

(30) Foreign Application Priority Data

Jun. 28, 2016 (JP) ................................ 2016-127493

(51) Int. Cl.
*F01D 25/30* (2006.01)
*F01D 5/04* (2006.01)
(Continued)

(52) U.S. Cl.
CPC ............. *F01D 25/30* (2013.01); *F01D 5/043* (2013.01); *F01D 15/08* (2013.01); *F01D 17/105* (2013.01);
(Continued)

(58) Field of Classification Search
CPC ........ F01D 5/043; F01D 15/08; F01D 17/105; F01D 25/24; F01D 25/30; F02B 33/40;
(Continued)

(56) References Cited

U.S. PATENT DOCUMENTS

| 8,534,994 B2* | 9/2013 | Lombard ............. F01D 17/105 415/145 |
| 2010/0074744 A1* | 3/2010 | Phillips, Jr. ............ F01D 9/026 415/208.1 |

(Continued)

FOREIGN PATENT DOCUMENTS

| CN | 102667098 | 9/2012 |
| CN | 104110300 | 10/2014 |

(Continued)

OTHER PUBLICATIONS

"Office Action of Japan Counterpart Application," dated Mar. 6, 2018, with English translation thereof, p. 1-p. 6.
(Continued)

*Primary Examiner* — David E Sosnowski
*Assistant Examiner* — Sang K Kim
(74) *Attorney, Agent, or Firm* — JCIPRNET

(57) ABSTRACT

A turbine (3) includes: a turbine impeller chamber (43) having a tubular outflow portion (432), from which an exhaust gas flows out in an outflow direction (F) substantially parallel to an axis (C) of a turbine impeller (5); a bypass flow passage (491) bypassing the inside of the turbine impeller chamber; an outer duct (47) having an inner peripheral surface (475) that expands in diameter in the outflow direction from the outflow portion; and an inner duct (48) that extends in the outflow direction from the outflow portion. A diffuser flow passage (483) that expands in diameter in the outflow direction is disposed in the inner duct at least in a portion between the outflow portion and a distal end portion (481a). An outlet (492) of the bypass flow passage and a waste gate valve (493) that opens and closes the outlet are disposed on the inner peripheral surface.

5 Claims, 6 Drawing Sheets

(51) Int. Cl.
*F01D 15/08* (2006.01)
*F01D 17/10* (2006.01)
*F02B 33/40* (2006.01)
*F02B 37/18* (2006.01)

(52) U.S. Cl.
CPC ............ *F02B 33/40* (2013.01); *F02B 37/183* (2013.01); *F05D 2220/40* (2013.01); *Y02T 10/144* (2013.01)

(58) Field of Classification Search
CPC ...... F02B 37/18; F02B 37/183; F02B 37/186; F02C 6/12; F05D 2220/40
See application file for complete search history.

(56) References Cited

U.S. PATENT DOCUMENTS

2015/0240656 A1* 8/2015 Ehrhard ................ F01D 17/105
　　　　　　　　　　　　　　　　　　　415/145

2015/0361985 A1* 12/2015 Edwards ................ F02B 37/00
　　　　　　　　　　　　　　　　　　　60/602

FOREIGN PATENT DOCUMENTS

| CN | 104838110 | 8/2015 |
| EP | 0078637 | 5/1983 |
| JP | 55-025505 | 2/1980 |
| JP | S59179221 | 11/1984 |
| JP | H10-082324 | 3/1998 |
| JP | 2015190374 | 11/2015 |

OTHER PUBLICATIONS

"Office Action of China Counterpart Application", dated Mar. 1, 2019, with English translation thereof, p. 1-p. 12.

"Notification of Reasons for Refusal of Japan Counterpart Application," dated Sep. 4, 2018, with English translation thereof, p. 1-p. 6.

* cited by examiner

TURBINE

CROSS-REFERENCE TO RELATED APPLICATION

This application claims the priority benefit of Japan application serial no. 2016-127493, filed on Jun. 28, 2016. The entirety of the above-mentioned patent application is hereby incorporated by reference herein and made a part of this specification.

BACKGROUND OF THE DISCLOSURE

Field of the Disclosure

The disclosure relates to a turbine and more particularly relates to a turbine including a bypass flow passage that bypasses the inside of an impeller chamber, which houses an impeller, and a waste gate valve that opens and closes the bypass flow passage.

Description of Related Art

A supercharging system of an internal combustion engine is provided with a supercharger, in which a compressor impeller disposed in an intake flow passage of the internal combustion engine and a turbine impeller disposed in an exhaust flow passage are connected by a rotating shaft. In the supercharging system, an exhaust gas of the internal combustion engine is applied on the turbine impeller, so as to convert a part of the energy of the exhaust gas into an axial output of the rotating shaft, use the axial output to rotationally drive the compressor impeller, and supercharge intake air of the internal combustion engine. Such a supercharger is also provided with a waste gate mechanism for increasing or decreasing the flow rate of the exhaust gas applied on the turbine impeller. The waste gate mechanism includes a bypass flow passage for the exhaust gas to bypass the turbine impeller, and a waste gate valve for opening and closing the bypass flow passage.

In most cases, the outlet of the bypass flow passage and the waste gate valve for opening and closing the outlet are disposed in the vicinity of the outlet of the turbine impeller. Therefore, the flow passage cross-sectional area of the exhaust gas increases abruptly at the outlet of the turbine impeller, resulting in significant pressure loss at the outlet of the turbine impeller.

In addition, Japanese Patent Publication No. H10-82324 has disclosed a technique of disposing pipe materials separately at the outlet of the turbine impeller and the outlet of the bypass flow passage, and connecting these pipe materials near the distal ends thereof with the respective axes intersecting each other at an acute angle. It is considered that, by disposing separate pipes at the outlet of the turbine impeller and the bypass flow passage in this manner, the flow passage cross-sectional area can be prevented from increasing abruptly at the outlet of the turbine impeller, and therefore increase in pressure loss at the outlet of the turbine impeller can be suppressed.

SUMMARY OF THE DISCLOSURE

Problem to be Solved

However, since the two pipes are disposed in parallel in the disclosure of Japanese Patent Publication No. H10-82324, the area in contact with the outside air increases and the heat of the turbine may be released easily, thereby the turbine efficiency may decrease. Moreover, the exhaust gas discharged from the outlet of the turbine impeller has a high dynamic pressure. In order to reduce collision loss and friction loss, it is necessary to decelerate the exhaust gas discharged from the outlet of the turbine impeller to an appropriate speed. In the disclosure of Japanese Patent Publication No. H10-82324, however, the pipe material connected to the outlet of the turbine impeller has a substantially constant flow passage cross-sectional area. Therefore, such a deceleration effect cannot be achieved.

The disclosure provides a turbine that is capable of decelerating a fluid discharged from the outlet of the turbine impeller without reducing the turbine efficiency or increasing pressure loss at the outlet of the turbine impeller.

Solution to the Problem (1) A turbine (for example, the turbine 3 which will be described later) is for rotating an impeller (for example, the turbine impeller 5 which will be described later) by using energy of a fluid. The turbine includes: an impeller chamber (for example, the turbine impeller chamber 43 which will be described later) rotatably housing the impeller and including an inflow portion (for example, the inflow portion 431 which will be described later) of the fluid and an outflow portion (for example, the outflow portion 432 which will be described later), from which the fluid flows out in an outflow direction (for example, the outflow direction F which will be described later) substantially parallel to an axis (for example, the axis C which will be described later) of the impeller; a bypass flow passage (for example, the bypass flow passage 491 which will be described later) bypassing an inside of the impeller chamber; an outer duct (for example, the outer duct 47 which will be described later) having an inner peripheral surface (for example, the inner peripheral surface 475 which will be described later) that is substantially conical and expands in diameter in the outflow direction from the outflow portion; and an inner duct (for example, the inner duct 48 which will be described later) disposed on an inner side of the outer duct and being tubular and extending in the outflow direction from the outflow portion. A diffuser flow passage (for example, the diffuser flow passage 483 which will be described later) that expands in diameter in the outflow direction is disposed in the inner duct at least in a portion between the outflow portion and a distal end portion (for example, the distal end portion 481a which will be described later) of the inner duct, and an outlet (for example, the outlet 492 which will be described later) of the bypass flow passage and a waste gate valve (for example, the waste gate valve 493 which will be described later) that opens and closes the outlet are disposed on the inner peripheral surface.

(2) In this case, preferably, an outer flange (for example, the outer flange 471 which will be described later) that extends in a radial direction of the impeller is disposed on a distal end portion of the outer duct, an inner flange (for example, the inner flange 485 which will be described later) that extends in the radial direction of the impeller and has one or more through holes (for example, the through holes 489a to 489f which will be described later) is disposed on the distal end portion (for example, the distal end portion 481a which will be described later) of the inner duct, and the inner flange is fixed to the outer flange.

(3) In this case, preferably, an outer opening portion (for example, the outer opening portion 476 which will be described later) is formed on a base end portion of the outer duct to be connected to the inner peripheral surface of the outflow portion, an inner opening portion (for example, the inner opening portion 484 which will be described later) is formed on a base end portion of the inner duct to be connected to a flow passage formed inside the inner duct and opposed to the outer opening portion in a state where the inner flange is fixed to the outer flange, and a gap (for example, the gap 49 which will be described later) is formed between the outer opening portion and the inner opening portion in a state where the inner flange is fixed to the outer flange and the outflow portion and the inner duct are at a room temperature.

(4) In this case, preferably, an inner diameter (di) of the inner duct on an inner opening portion side is slightly larger than and an inner diameter (do) of the outflow portion on an outer opening portion side in the state where the inner flange is fixed to the outer flange and the outflow portion and the inner duct are at the room temperature.

(5) In this case, preferably, a divergent angle (2θ) between an inlet and an outlet of a flow passage formed inside the inner duct is in a range of 8 degrees to 30 degrees.

Effects of the Disclosure (1) In the disclosure, the outer duct and the inner duct are disposed in the outflow portion, through which the fluid flows out from the impeller chamber in the outflow direction. The outer duct has the substantially conical inner peripheral surface, which expands in diameter in the outflow direction from the outflow portion. The tubular inner duct extends in the outflow direction from the outflow portion. A space is formed between the outer duct and the inner duct by forming the inner peripheral surface of the outer duct into the substantially conical shape, and the outlet of the bypass flow passage and the waste gate valve which opens and closes the outlet are disposed on the inner peripheral surface of the outer duct. Thus, the fluid that flows out from the outlet of the bypass flow passage flows between the outer duct and the inner duct, and the fluid that flows out from the outflow portion of the impeller chamber flows through the inside of the inner duct. As a result, the flow passage cross-sectional area of the fluid flowing out from the outflow portion of the impeller chamber does not increase abruptly, so that an increase in the pressure loss in the outflow portion can be suppressed. In addition, by disposing the inner duct on the inner side of the outer duct, the inner duct is not directly exposed to the outside air. Thus, the heat in the impeller chamber can be prevented from releasing, and drop of the turbine efficiency can be suppressed. Moreover, by disposing the diffuser flow passage which expands in diameter in the outflow direction in the inner duct at least in a portion between the outflow portion and the distal end portion, the fluid that flows out from the outflow portion can be decelerated in the process of flowing through the diffuser flow passage to increase the static pressure. Therefore, collision loss or friction loss can be reduced.

(2) In the disclosure, the outer flange is disposed on the distal end portion of the outer duct on the side opposite to the outflow portion and the inner flange having one or more through holes are disposed on the distal end portion of the inner duct on the side opposite to the outflow portion, and the inner duct is attached to the outer duct by fixing the inner flange and the outer flange. That is, the fluid that flows out from the bypass flow passage flows between the outer duct and the inner duct and merges with the fluid that flows inside the inner duct through the through holes formed on the inner flange. Therefore, according to the disclosure, the inner duct can be fixed to the outer duct without hindering flow of the fluid that flows out from the bypass flow passage. In addition, because the flange is in contact with the outside by a large area, the temperature drop is large. Thus, in the disclosure, the flanges are disposed on the distal end portions away from the outflow portion as described above to make it more difficult for the heat inside the turbine impeller chamber to be released and reduce the temperature difference between the outer duct and the inner duct, so that reduction of the turbine efficiency can be further suppressed.

(3) According to the disclosure, in the state where the inner flange is fixed to the outer flange and the outflow portion and the inner duct are at room temperature, the inner opening portion connected to the flow passage formed inside the inner duct and the outer opening portion connected to the inner peripheral surface of the outflow portion are opposed to each other, and the gap is formed therebetween. Here, because the high-temperature fluid that flows out from the turbine impeller chamber flows from the outflow portion to the inner duct, the temperature of the inner duct may rise and cause the inner duct to thermally extend along the axis. In the disclosure, the gap formed between the inner opening portion and the outer opening portion at room temperature allows the inner duct to thermally extend toward the side of the outflow portion during thermal extension of the inner duct.

(4) According to the disclosure, in the state where the inner flange is fixed to the outer flange and the outflow portion and the inner duct are at room temperature, the inner diameter of the inner duct is slightly larger than the inner diameter of the outflow portion. Here, because the high-temperature fluid that flows out from the turbine impeller chamber flows from the outflow portion to the inner duct, the temperatures of the outflow portion and the inner duct rise, and the respective inner diameters thereof increase due to thermal expansion. Upon comparison between the temperature of the inner duct and the temperature of outflow portion at this time, the outflow portion is closer to the turbine impeller chamber, and therefore has a higher temperature and expands more. According to the disclosure, the temperature difference between the inner duct and the outflow portion is taken into consideration, and when these are at room temperature, the inner diameter of the inner duct on the side of the inner opening portion is larger than the inner diameter of the outflow portion on the side of the outer opening portion. Thus, when the inner duct and the outflow portion are at a high temperature, the inner diameter of the inner duct and the inner diameter of the outflow portion can be substantially equal to each other to make the inner peripheral surface of the inner duct and the inner peripheral surface of the outflow portion substantially flush with each other. Therefore, the loss between the inner duct and the outflow portion can be reduced.

(5) Theoretically, the static pressure recovery coefficient of the flow passage formed inside the inner duct increases as the divergent angle 2θ between the inlet and the outlet increases. However, the divergent angle 2θ has a limit, and if it expands beyond the limit, the fluid may be separated from the inner peripheral surface of the flow passage and cause a turbulent flow, and the static pressure recovery coefficient may decrease instead. In the disclosure, the divergent angle 2θ between the inlet and the outlet of the flow passage forming inside the inner duct is set in the range of 8 degrees to 30 degrees. By setting the divergent angle in such a range, the static pressure recovery coefficient can be set to an appropriate value in a range that does not cause fluid separation.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Hereinafter, an embodiment of the disclosure is described with reference to the figures.

Figure 1:
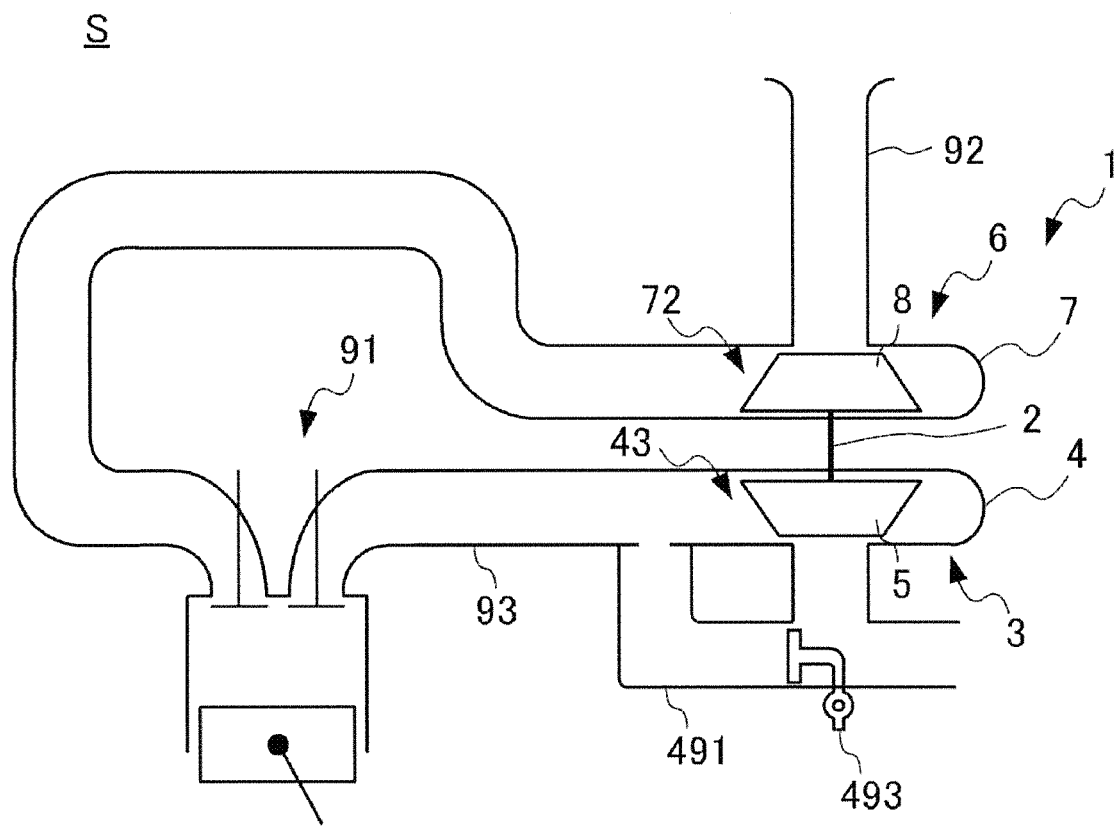
FIG. 1 is a diagram showing the configuration of a supercharging system of an internal combustion engine to which a turbine is applied according to an embodiment of the disclosure.

FIG. 1 is a diagram showing the configuration of a supercharging system S of an internal combustion engine 91 to which a turbine 3 is applied according to the present embodiment.

The supercharging system S includes an intake flow passage 92 that introduces intake air to a combustion chamber of the internal combustion engine 91, an exhaust flow passage 93 that guides an exhaust gas discharged from the combustion chamber of the internal combustion engine 91, and a supercharger 1 that is configured by connecting a compressor 6 disposed in the intake flow passage 92 and the turbine 3 disposed in the exhaust flow passage 93 with a rotating shaft 2 and compresses the intake air by using energy of the exhaust gas.

The turbine 3 includes a turbine housing 4, a turbine impeller 5, a bypass flow passage 491, and a waste gate valve 493. The turbine housing 4 is formed with a turbine impeller chamber 43 that constitutes a part of the exhaust flow passage 93. The turbine impeller 5 is disposed to be rotatable around the rotating shaft 2 in the turbine impeller chamber 43. The bypass flow passage 491 bypasses the inside of the turbine impeller chamber 43. The waste gate valve 493 opens and closes the bypass flow passage 491.

The compressor 6 includes a compressor housing 7 and a compressor impeller 8. The compressor housing 7 is formed with a compressor impeller chamber 72 that constitutes a part of the intake flow passage 92, and the compressor impeller 8 is disposed to be rotatable around the rotating shaft 2 in the compressor impeller chamber 72.

The supercharger 1 compresses the intake air by using the energy of the exhaust gas in the following manner. First, when the waste gate valve 493 is controlled to a closing side, the exhaust gas of the internal combustion engine 91 is introduced into the turbine impeller chamber 43. The exhaust gas introduced into the turbine impeller chamber 43 is applied on the turbine impeller 5 in the process of flowing from an inlet to an outlet in the turbine impeller chamber 43, and due to the energy of the exhaust gas, the turbine impeller 5 rotates around the rotating shaft 2. As the rotating shaft 2 rotates, the compressor impeller 8 connected thereto rotates, by which the intake air flowing through the intake flow passage 92 and introduced into the internal combustion engine 91 is compressed.

Hereinafter, the configuration of the turbine 3 is described in detail with reference to FIG. 2 to FIG. 7.

Figure 2:
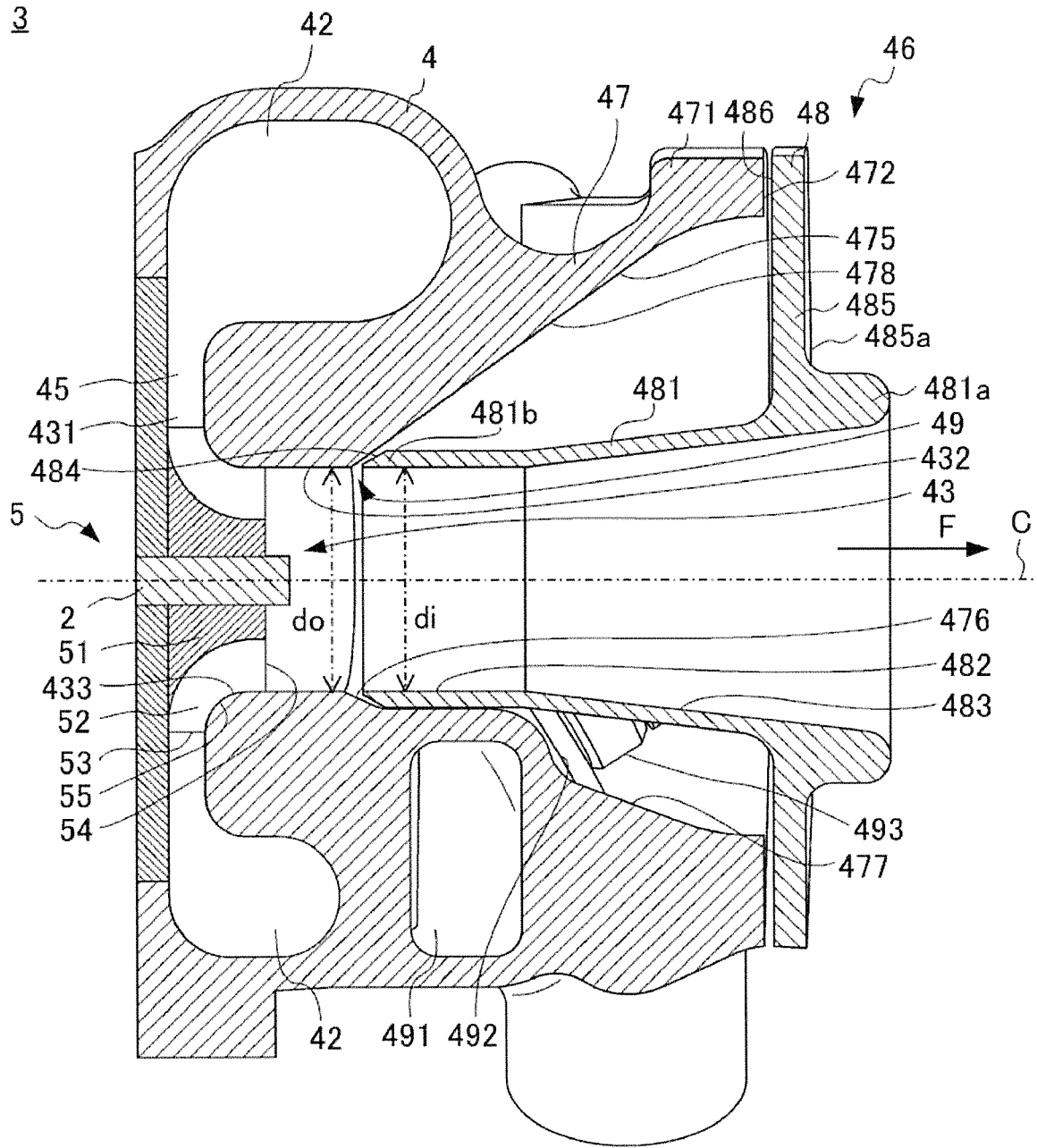
FIG. 2 is a cross-sectional view showing the configuration of the turbine.

FIG. 2 is a cross-sectional view showing the configuration of the turbine 3 according to the present embodiment.

The turbine 3 includes a turbine housing 4 that constitutes a part of the exhaust flow passage, and a turbine impeller 5 disposed in the turbine housing 4. The turbine 3 converts the energy of the exhaust gas flowing through the exhaust flow passage into mechanical power for rotating the rotating shaft 2 and the compressor impeller 8 connected thereto (see FIG. 1).

In the turbine housing 4, an exhaust introduction duct (not shown), an annular turbine scroll flow passage 42, the turbine impeller chamber 43, an annular exhaust flow passage 45, and an exhaust duct 46 are disposed. The exhaust introduction duct is connected to the exhaust flow passage of the internal combustion engine. The turbine scroll flow passage 42 is for the exhaust gas introduced from the exhaust introduction duct to flow through. The turbine impeller chamber 43 rotatably houses the turbine impeller 5 and is provided with an inflow portion 431 as the inlet of the exhaust gas and an outflow portion 432 as the outlet of the exhaust gas. The exhaust flow passage 45 communicates the turbine scroll flow passage 42 and the inflow portion 431 of the turbine impeller chamber 43. The exhaust duct 46 guides the exhaust gas that flows out from the outflow portion 432 of the turbine impeller chamber 43.

The turbine impeller 5 includes a conical wheel 51 and a plurality of plate-shaped blades 52 disposed on an outer peripheral surface of the wheel 51. The wheel 51 has a hub surface that reduces in diameter smoothly from the side of the inflow portion 431 toward the side of the outflow portion 432 along an axis C of the rotating shaft 2. The blades 52 are arranged at equal intervals along a circumferential direction on the hub surface of the wheel 51. Each of the blades 52 has a plate shape that extends in a predetermined angular distribution from a front edge portion 53, which is the inlet of the exhaust gas, toward a rear edge portion 54, which is the outlet of the exhaust gas, on the hub surface. A tip end edge 55 of each of the blades 52 is formed along the surface shape of an opposing shroud 433, which will be described later, when the turbine impeller 5 is housed in the turbine impeller chamber 43.

The turbine scroll flow passage 42 is annular and is formed to surround the turbine impeller chamber 43. The turbine scroll flow passage 42 extends along the circumferential direction of the turbine impeller 5 from a base end side connected to the exhaust introduction duct to a distal end side. Moreover, a flow passage cross-sectional area of the turbine scroll flow passage 42 gradually decreases in the same direction as a rotation direction of the turbine impeller 5. As a result, the exhaust gas introduced from the exhaust introduction duct is accelerated in the same direction as the rotation direction of the turbine impeller 5 in the process of flowing through the turbine scroll flow passage 42 while flowing into the inflow portion 431 of the turbine impeller chamber 43 via the exhaust flow passage 45.

The shroud 433 is formed in the turbine impeller chamber 43 to cover a side portion of the turbine impeller 5. The shroud 433 has a shroud surface shaped along the tip end edge 55 from the front edge portion 53 to the rear edge portion 54 of the turbine impeller 5. More specifically, when the turbine impeller 5 rotates around the rotating shaft 2, the shape of the shroud surface is substantially equal to an envelope surface formed by the tip end edge 55 of the turbine impeller 5. The shroud 433 covers the tip end edge 55, which is the side portion of the turbine impeller 5, with this shroud surface.

A side of the shroud 433 on the front edge portion 53 of the turbine impeller 5 is the annular inflow portion 431 that has a width substantially equal to a height of the front edge portion 53. Moreover, a side of the shroud 433 on the rear edge portion 54 of the turbine impeller 5 is the tubular outflow portion 432 that is substantially parallel to the axis C of the rotating shaft 2. The outflow portion 432 does not necessarily have a substantially constant inner diameter along the axis C as shown in FIG. 2, and may have an inner diameter that expands in an outflow direction F or be shaped like an annular opening that is concentric with the rotating shaft 2.

The exhaust gas accelerated by the turbine scroll flow passage 42 in the same direction as the rotation direction of the turbine impeller 5 flows to the front edge portion 53 of the turbine impeller 5 disposed in the turbine impeller chamber 43 via the inflow portion 431 and flows through the flow passage formed between the blades 52 along the hub surface, and then flows out from the rear edge portion 54. The exhaust gas that flows out from the rear edge portion 54 flows through the outflow portion 432 in the outflow direction F that is substantially parallel to the axis C.

Figure 3:
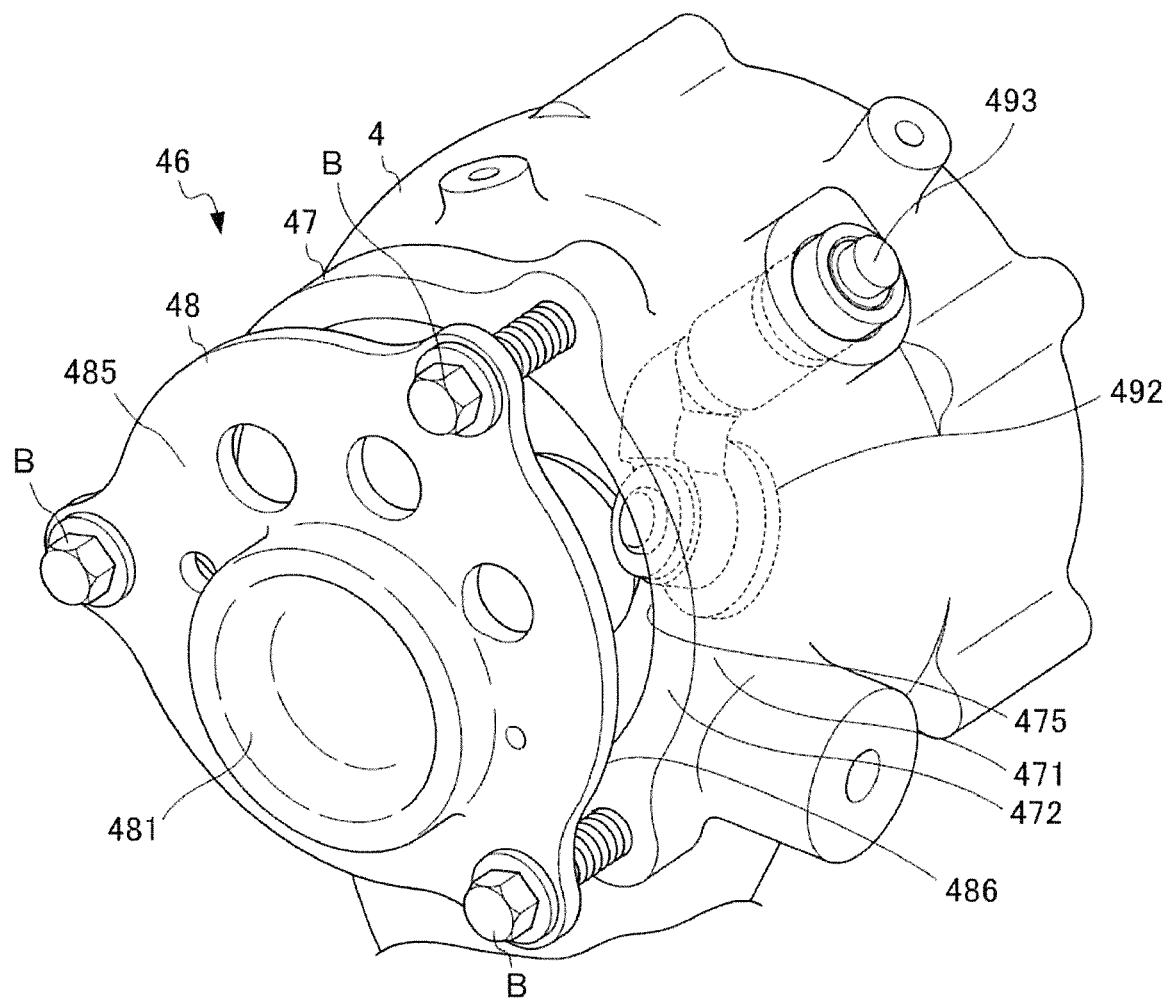
FIG. 3 is a perspective view showing the configuration of an exhaust duct.

FIG. 3 is a perspective view showing the configuration of the exhaust duct 46. The exhaust duct 46 is formed by fastening an outer duct 47 and an inner duct 48 with bolts B which are a plurality of fastening members. The outer duct 47 is an integral part of the turbine impeller chamber 43 or the turbine scroll flow passage 42, that is, a part of the turbine housing 4. The inner duct 48 is a separate part from the outer duct 47 and is disposed on the inner side of the outer duct 47.

Figure 4:
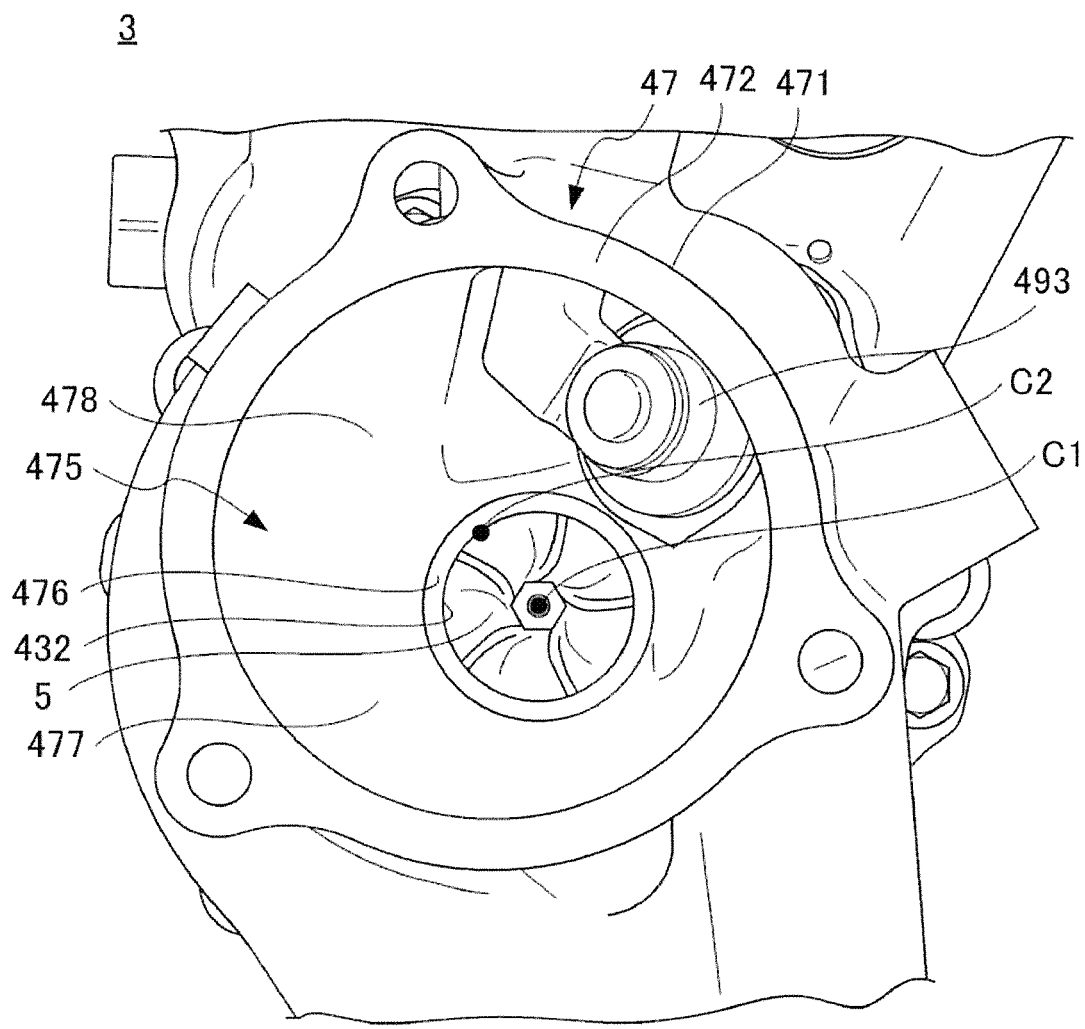
FIG. 4 is a front view of an outer duct as viewed along an axis of a rotating shaft.

FIG. 4 is a front view of the outer duct 47 as viewed along the axis of the rotating shaft.

Figure 5:
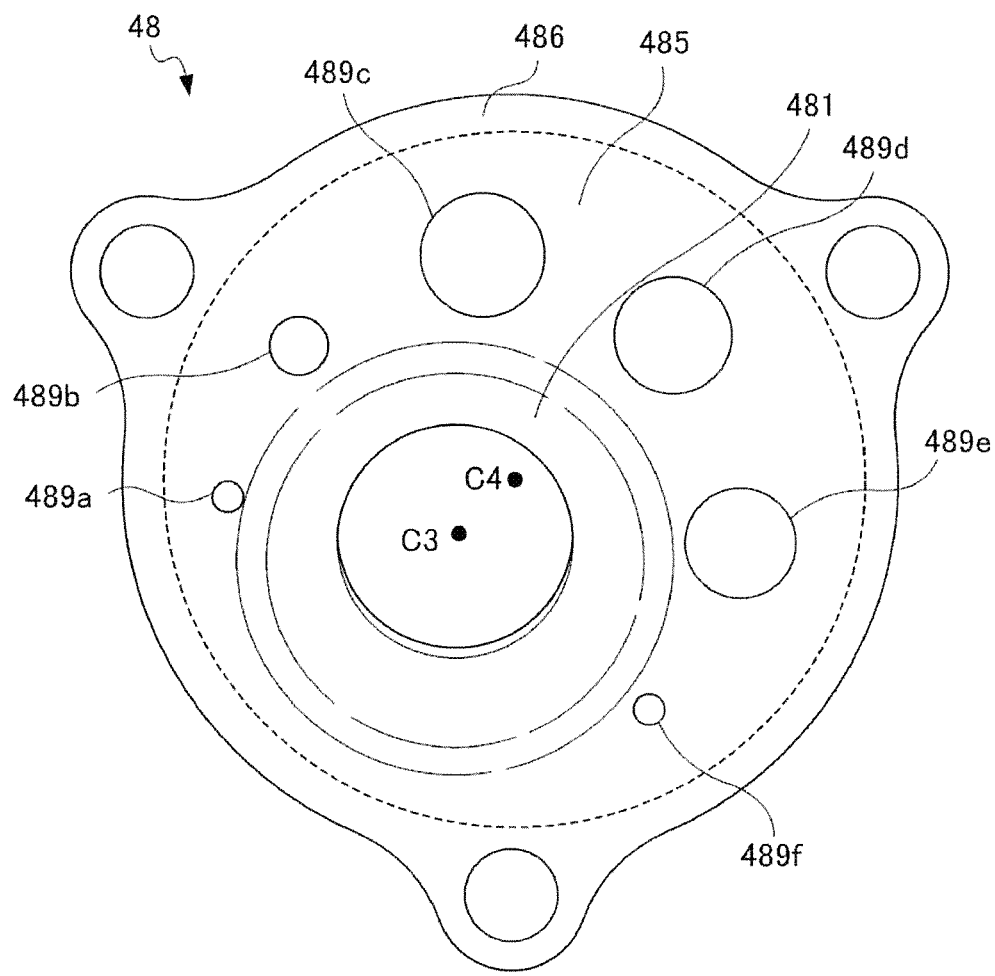
FIG. 5 is a front view of an inner duct as viewed along the axis of the rotating shaft.

FIG. 5 is a front view of the inner duct 48 as viewed along the axis of the rotating shaft.

The outer duct 47 has a tubular shape that extends in the outflow direction F from the outflow portion 432 of the turbine impeller chamber 43, and an outer flange 471 having a flange surface 472 that extends in a radial direction of the turbine impeller 5 is formed on a distal end portion on the side of the outflow direction F. In addition, an inner peripheral surface 475 of the outer duct 47 has a substantially truncated conical shape that expands in diameter in the outflow direction F from the outflow portion 432 of the turbine impeller chamber 43. The inner peripheral surface 475 of the outer duct 47 has an annular outer opening portion 476 that is formed on the side of the outflow portion 432 of the turbine impeller chamber 43. The outer opening portion 476 is concentric with the rotating shaft 2 and connected to an inner peripheral surface of the outflow portion 432.

As shown in FIG. 4, the center of the inner peripheral surface 475 of the outer duct 47 is decentered on the side of the outflow portion 432 and the side of the outer flange 471. More specifically, a center C1 of the inner peripheral surface 475 on the side of the outflow portion 432 is shifted to the lower right side in FIG. 4 with respect to a center C2 of the inner peripheral surface 475 on the side of the outer flange 471. Therefore, a divergent angle of the inner peripheral surface 475 is not uniform along the circumferential direction of the turbine impeller 5. That is, when viewed along the axis of the turbine impeller 5, the inner peripheral surface 475 has a steep slope surface 477 that has a small divergent angle near the center C1 and a gentle slope surface 478 that has a large divergent angle near the center C2.

Moreover, an outlet 492 of the aforementioned bypass flow passage 491 and the waste gate valve 493 that opens and closes the outlet 492 are disposed on the steep slope surface 477, which has the small divergent angle described above, of the inner peripheral surface 475 of the outer duct 47. Accordingly, when the waste gate valve 493 is opened, the exhaust gas bypassing the inside of the turbine impeller chamber 43 is discharged between the outer duct 47 and the inner duct 48 from the outlet 492 of the bypass flow passage 491.

The inner duct 48 includes a tubular central duct 481 and an inner flange 485. The central duct 481 extends in the outflow direction F from the outflow portion 432 of the turbine impeller chamber 43. The inner flange 485 extends in the radial direction of the turbine impeller 5 on a distal end portion 481a of the central duct 481. As shown in FIG. 2, the distal end portion 481a of the central duct 481 protrudes slightly in the outflow direction F with respect to a front surface 485a of the inner flange 485.

Inside the central duct 481, a straight flow passage 482 and a diffuser flow passage 483 are formed. The straight flow passage 482 extends along the axis C with a constant inner diameter from the side of the outflow portion 432 of the turbine impeller chamber 43. The diffuser flow passage 483 extends along the axis C and expands in diameter in the outflow direction F from the straight flow passage 482 to the distal end portion 481a. In addition, an annular inner opening portion 484 is formed on a base end portion 481b of the central duct 481 on the side of the outflow portion 432 of the turbine impeller chamber 43. The inner opening portion 484 is connected to the straight flow passage 482 and is opposed to the outer opening portion 476 formed on the outer duct 47.

Although the following describes a case where the flow passage inside the central duct 481 is formed by combining the straight flow passage 482 that has a constant inner diameter and the diffuser flow passage 483 that has an expanding inner diameter as shown in FIG. 2, it is not necessary to dispose the straight flow passage 482. In other words, it suffices if the flow passage inside the central duct 481 expands from the inlet side to the outlet side at a divergent angle 2θ, which will be described later.

An annular flange surface 486 is formed on a peripheral edge of the inner flange 485 on the side of the outer duct 47 to be in contact with the flange surface 472 of the outer duct 47. In addition, as shown in FIG. 5, a plurality of through holes 489a, 489b, 489c, 489d, 489e, and 489f (the number is six, in the example of FIG. 5), through which the exhaust gas discharged from the outlet 492 of the bypass flow passage 491 flows, are formed between the flange surface 486 of the inner flange 485 and the central duct 481. The through holes 489a, 489b, 489c, 489d, 489e, and 489f are formed at intervals along the circumferential direction of the turbine impeller 5.

As shown in FIG. 5, the center of the inner duct 48 is decentered on the side of the central duct 481 and the side of the inner flange 485. More specifically, a center C3 of the central duct 481 is shifted to the lower left side in FIG. 5 with respect to a center C4 of the flange surface 486. In a state where the inner duct 48 is fixed to the outer duct 47, the center C3 of the inner duct 48 substantially coincides with the center C1 of the outer duct 47, and the center C4 of the inner duct 48 substantially coincides with the center C2 of the outer duct 47 (see FIG. 4). Therefore, a length of the inner flange 485 along the radial direction of the turbine impeller 5 between the flange surface 486 and the central duct 481 is not uniform along the circumferential direction. Thus, the areas of the through holes 489*a*, 489*b*, and 489*f* formed near the center C3 are smaller than the areas of the through holes 489*c*, 489*d*, and 489*e* formed near the center C4.

Here, because the exhaust gas discharged from the outlet 492 of the bypass flow passage 491 does not pass through the inside of the turbine impeller chamber 43, the temperature thereof is higher than that of the exhaust gas discharged from the central duct 481. In the inner duct 48 of the present embodiment, the through holes 489*a* to 489*f* are formed around the central duct 481 in this manner, so as to agitate the high-temperature exhaust gas that has passed through the bypass flow passage 491. Therefore, the high-temperature exhaust gas can be brought into contact with an exhaust purification catalyst disposed on the downstream side of the inner duct 48 evenly, so that the temperature of the exhaust purification catalyst can be promptly increased.

The number or shape of these through holes 489*a* to 489*f* is not limited to the disclosure of FIG. 5. That is to say, the number of the through holes serving as the flow passage for the exhaust gas that passes through the bypass flow passage 491 is not necessarily six as shown in the example of FIG. 5, and may be at least one. Furthermore, the shape of the through holes is not necessarily circular as shown in FIG. 5 and may also be elliptical or rectangular, or an arc-shaped slit may be formed by connecting the through holes 489*a* to 489*f*.

The inner duct 48 and the outer duct 47 configured as described above are fastened by the bolts B to be fixed, such that the flange surface 486 of the inner flange 485 and the flange surface 472 of the outer flange 471 are in contact with each other, the center C3 of the inner duct 48 substantially coincides with the center C1 of the outer duct 47, and the center C4 of the inner duct 48 substantially coincides with the center C2 of the outer duct 47.

Furthermore, as shown in FIG. 2, when the inner duct 48 is fixed to the outer duct 47, the inner opening portion 484 of the inner duct 48 is opposed to the outer opening portion 476 of the outer duct 47, by which the flow passage in the outflow portion 432 and the straight flow passage 482 and the diffuser flow passage 483 in the inner duct 48 form the flow passage for the exhaust gas.

In addition, considering that the inner duct 48 would thermally extend along the axis of the rotating shaft 2 due to the heat of the exhaust gas, a gap 49 is formed between the inner opening portion 484 and the outer opening portion 476 when the outflow portion 432 and the inner duct 48 are at room temperature. Besides, the outflow portion 432 and the inner duct 48 thermally expand due to the heat of the exhaust gas, and the respective inner diameters thereof increase. At this time, because the outflow portion 432 is closer to the turbine impeller chamber 43 than the inner duct 48, the outflow portion 432 expands more than the inner duct 48. Considering that the outflow portion 432 and the inner duct 48 have such a temperature difference, in the state where the outflow portion 432 and the inner duct 48 are at room temperature, an inner diameter di of the inner duct 48 on the side of the inner opening portion 484 is formed slightly larger than an inner diameter do of the outflow portion 432 on the side of the outer opening portion 476.

Moreover, since the gap 49 is formed between the inner opening portion 484 and the outer opening portion 476, a part of the exhaust gas that flows out from the outflow portion 432 may flow between the inner duct 48 and the outer duct 47 via the gap 49 and not flow through the flow passage in the inner duct 48. Thus, in the present embodiment, both the inner opening portion 484 and the outer opening portion 476 are formed in a tapered shape that expands in diameter in the outflow direction F, as shown in FIG. 2. As a result, while the gap 49 between the inner opening portion 484 and the outer opening portion 476 can be ensured to allow thermal extension, flow of the exhaust gas into the gap 49 can be suppressed. In addition to the above, although not shown in the figures, an annular protrusion or recess may be formed on the inner opening portion 484 and an annular recess or protrusion corresponding thereto may be formed on the outer opening portion 476, so as to ensure the gap 49 as well as suppress flow of the exhaust gas into the gap 49.

Furthermore, as shown in FIG. 2, when the inner duct 48 is fixed to the outer duct 47, the central duct 481 of the inner duct 48 is connected to the turbine impeller chamber 43 via the slight gap 49. As a result, the outflow portion 432 forming in the turbine impeller chamber 43 and the straight flow passage 482 and the diffuser flow passage 483 formed inside the central duct 481 are substantially integrated. Accordingly, the exhaust gas that passes through the inside of the turbine impeller chamber 43 and flows out from the outflow portion 432 in the outflow direction F is decelerated in the process of flowing through the straight flow passage 482 and the diffuser flow passage 483, and the static pressure increases. On the other hand, by opening the waste gate valve 493, the exhaust gas discharged from the outlet 492 of the bypass flow passage 491 flows through the flow passage formed between the inner peripheral surface 475 of the outer duct 47 and the outer peripheral surface of the central duct 481 of the inner duct 48, and is discharged to the outside of the inner duct 48 via the through holes 489*a* to 489*f* formed on the inner flange 485 to merge with the exhaust gas discharged from the central duct 481.

Here, a preferable setting of the divergent angle 2θ between the inlet and the outlet of the flow passage inside the central duct 481 is described with reference to FIG. 6 and FIG. 7.

Figure 6:
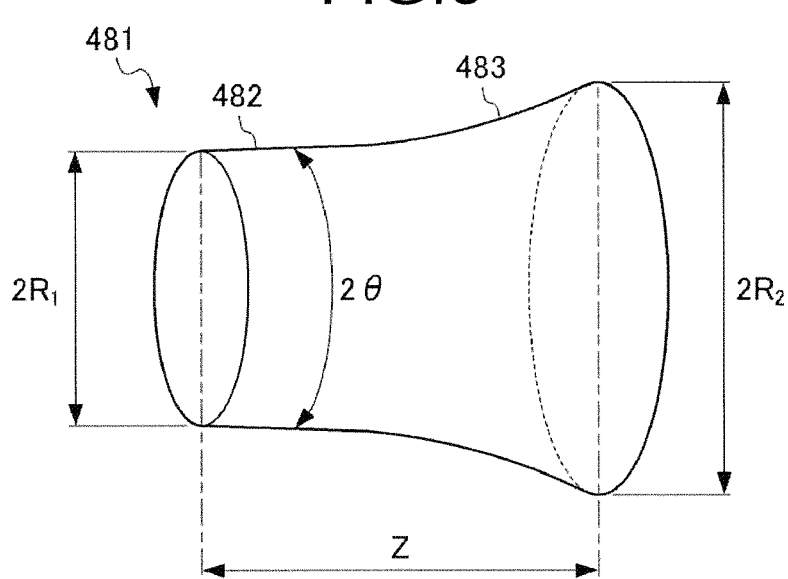
FIG. 6 is a diagram schematically showing the shape of a flow passage inside a central duct.

FIG. 6 is a diagram schematically showing the shape of the flow passage inside the central duct 481.

As described above, the flow passage formed inside the central duct 481 is formed by combining the straight flow passage 482 and the diffuser flow passage 483. Here, regarding the divergent angle 2θ between the inlet and the outlet of the flow passage inside the central duct 481, when the total length of the flow passage combining the straight flow passage 482 and the diffuser flow passage 483 is "Z", the radius of the straight flow passage 482 on the inlet side is "$R_1$", and the radius of the diffuser flow passage 483 on the outlet side is "$R_2$", the divergent angle 2θ is expressed by an arctangent function using these ($2\theta = 2\tan^{-1}((R_2-R_1)/Z)$).

Figure 7:
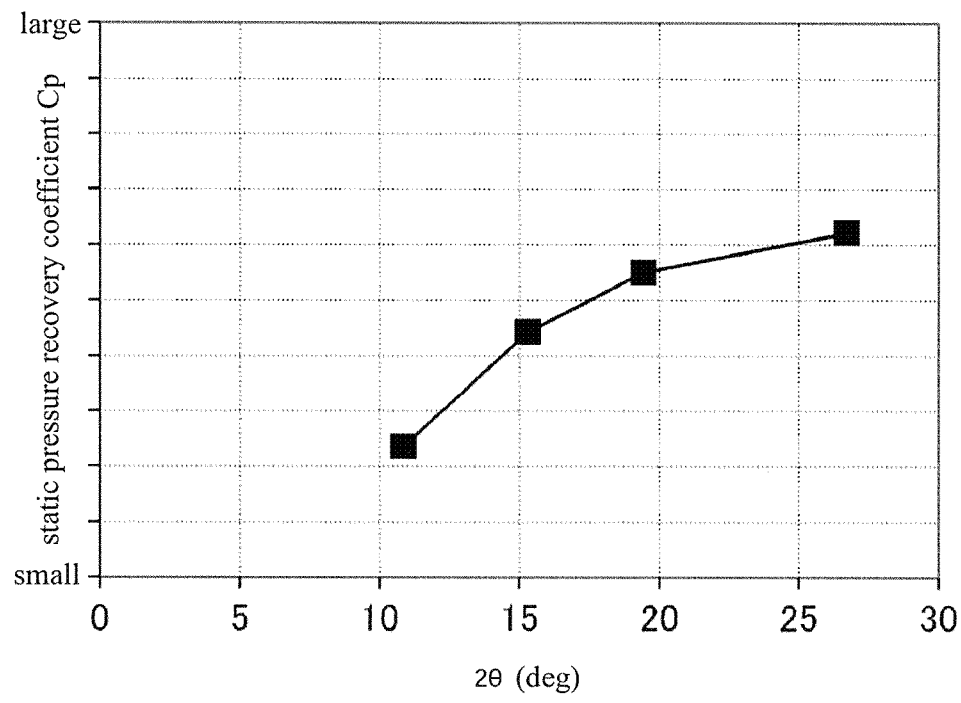
FIG. 7 is a diagram showing the relationship between a static pressure recovery coefficient and a divergent angle of the flow passage inside the central duct.

FIG. 7 is a diagram showing the relationship between a static pressure recovery coefficient Cp, which serves as an index of a static pressure recovery effect of the flow passage inside the central duct, and the divergent angle 2θ, as defined above. Theoretically, the static pressure recovery coefficient increases as the divergent angle 2θ of the inlet and the outlet increases. However, as shown in FIG. 7, the divergent angle 2θ has a limit, and if it expands beyond the limit, the exhaust gas may be separated from the inner peripheral surface of the flow passage and cause a turbulent flow, and the static pressure recovery coefficient may decrease instead. Therefore, according to the result of FIG. 7, the divergent angle 2θ of the flow passage inside the central duct is preferably set to a range of 8 degrees to 30 degrees, so as to achieve a sufficient static pressure recovery effect.

According to the turbine 3 of the present embodiment, the following effects are achieved.

(1) In the turbine 3, the outer duct 47 and the inner duct 48 are disposed in the outflow portion 432 of the turbine impeller chamber 43. The outer duct 47 has the inner peripheral surface 475 having the substantially truncated conical shape, which expands in diameter in the outflow direction F from the outflow portion 432. The inner duct 48 extends in the outflow direction F from the outflow portion 432. A space is formed between the outer duct 47 and the inner duct 48 by forming the inner peripheral surface 475 of the outer duct 47 into the substantially truncated conical shape, and the outlet 492 of the bypass flow passage 491 and the waste gate valve 493 which opens and closes the outlet 492 are disposed on the inner peripheral surface 475 of the outer duct 47. Thus, the exhaust gas that flows out from the outlet 492 of the bypass flow passage 491 flows between the outer duct 47 and the inner duct 48, and the exhaust gas that flows out from the outflow portion 432 of the turbine impeller chamber 43 flows through the inside of the central duct 481 of the inner duct 48. As a result, the flow passage cross-sectional area of the exhaust gas flowing out from the outflow portion 432 does not increase abruptly, so that an increase in the pressure loss in the outflow portion 432 can be suppressed. In addition, by disposing the inner duct 48 on the inner side of the outer duct 47, the inner duct 48 is not directly exposed to the outside air. Thus, the heat in the turbine impeller chamber 43 can be prevented from releasing, and drop of the turbine efficiency can be suppressed. Moreover, by disposing the diffuser flow passage 483 which expands in diameter in the outflow direction F inside the central duct 481 at least in a portion between the outflow portion 432 and the distal end portion 481*a*, the exhaust gas that flows out from the outflow portion 432 can be decelerated in the process of flowing through the diffuser flow passage 483 to increase the static pressure. Therefore, collision loss or friction loss can be reduced.

Figure 8:
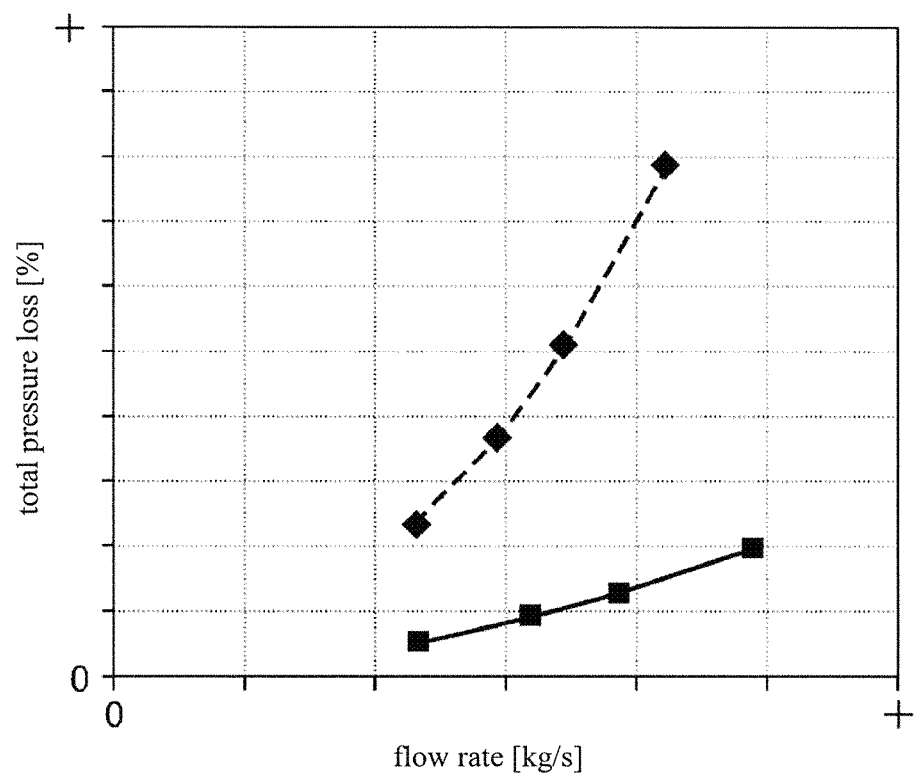
FIG. 8 is a diagram showing the relationship between an exhaust gas flow rate and total pressure loss of the exhaust duct.

FIG. 8 is a diagram showing the relationship between a flow rate [kg/s] of the exhaust gas in the exhaust duct and a total pressure loss [%]. In FIG. 8, the broken line indicates the total pressure loss between the inlet and the outlet of the exhaust duct of the conventional turbine 3 while the solid line indicates the total pressure loss between the inlet and the outlet of the exhaust duct 46 of the turbine 3 (that is, from the base end portion 481*b* to the distal end portion 481*a* of the central duct 481 of the inner duct 48 in the exhaust duct 46) according to the present embodiment. Here, the exhaust duct of the conventional turbine refers to one with the inner duct 48 removed from the turbine 3 of the present embodiment, that is, the outer duct 47. As shown in FIG. 8, according to the turbine 3 of the present embodiment, with the inner duct 48, the total pressure loss in the entire flow rate range can be lowered.

(2) In the turbine 3, the outer flange 471 is disposed on the distal end portion of the outer duct 47 on the side opposite to the outflow portion 432 and the inner flange 485 having the through holes 489*a* to 489*f* are disposed on the distal end portion 481*a* of the inner duct 48 on the side opposite to the outflow portion 432, and the inner duct 48 is attached to the outer duct 47 by fixing the inner flange 485 and the outer flange 471. That is, the exhaust gas that flows out from the bypass flow passage 491 flows between the outer duct 47 and the inner duct 48 and merges with the exhaust gas that flows inside the central duct 481 through the through holes 489*a* to 489*f* formed on the inner flange 485. Therefore, according to the turbine 3, the inner duct 48 can be fixed to the outer duct 47 without hindering flow of the exhaust gas that flows out from the bypass flow passage 491. In addition, because the flange is in contact with the outside by a large area, the temperature drop is large. Thus, in the turbine 3, the flanges 471 and 485 are disposed on the distal end portions away from the outflow portion 432 as described above to make it more difficult for the heat inside the turbine impeller chamber 43 to be released and reduce the temperature difference between the outer duct 47 and the inner duct 48, so that reduction of the turbine efficiency can be further suppressed.

(3) According to the turbine 3, in the state where the inner flange 485 is fixed to the outer flange 471 and the outflow portion 432 and the inner duct 48 are at room temperature, the inner opening portion 484 connected to the straight flow passage 482 and the outer opening portion 476 connected to the inner peripheral surface of the outflow portion 432 are opposed to each other, and the gap 49 is formed therebetween. In the turbine 3, the gap 49 formed as described above allows the inner duct 48 to thermally extend toward the side of the outflow portion 432 during thermal extension of the inner duct 48.

(4) According to the turbine 3, in the state where the inner flange 485 is fixed to the outer flange 471 and the outflow portion 432 and the inner duct 48 are at room temperature, the inner diameter di of the inner duct 48 is slightly larger than the inner diameter do of the outflow portion 432. The outflow portion 432 is closer to the turbine impeller chamber 43 than the inner duct 48, and therefore has a higher temperature than the inner duct 48 and expands more. According to the turbine 3, the difference in inner diameter is set with consideration of such a temperature difference, so that when the inner duct 48 and the outflow portion 432 are at a high temperature, the inner diameter di of the inner duct 48 and the inner diameter do of the outflow portion 432 can be substantially equal to each other to make the inner peripheral surface of the inner duct 48 and the inner peripheral surface of the outflow portion 432 substantially flush with each other. Thus, the loss between the inner duct 48 and the outflow portion 432 can be reduced.

(5) In the turbine 3, the divergent angle 2θ between the inlet and the outlet of the flow passage formed by the straight flow passage 482 and the diffuser flow passage 483 inside the central duct 481 is set in the range of 8 degrees to 30 degrees. By setting the divergent angle in such a range, the static pressure recovery coefficient can be set to an appropriate value in a range that does not cause fluid separation.

Although an embodiment of the disclosure has been described above, the disclosure is not limited thereto, and the detailed configuration may be modified where appropriate without departing from the scope of the spirit of the disclosure.

For example, the embodiment described above illustrates that the turbine of the disclosure is applied to the supercharger 1 that compresses the intake air sucked in by the internal combustion engine 91, but the disclosure is not limited thereto. The turbine of the disclosure is applicable not only to the supercharger of the internal combustion engine but also to the so-called turbo machine, such as jet engine and pump, that performs conversion between fluid energy and mechanical energy by using an impeller.

What is claimed is:

1. A turbine that rotates an impeller by energy of a fluid, the turbine comprising:
   an impeller chamber housing the impeller and comprising an inflow portion of the fluid and an outflow portion, from which the fluid flows out in an outflow direction substantially parallel to an axis of the impeller;

a bypass flow passage bypassing an inside of the impeller chamber;

an outer duct having an inner peripheral surface that is substantially conical and expands in diameter in the outflow direction from the outflow portion; and an inner duct disposed on an inner side of the outer duct and being tubular and extending in the outflow direction from the outflow portion, wherein a diffuser flow passage that expands in diameter in the outflow direction is disposed in the inner duct at least in a portion between the outflow portion and a distal end portion of the inner duct, and an outlet of the bypass flow passage and a waste gate valve that opens and closes the outlet are disposed on the inner peripheral surface, wherein an outer flange that extends in a radial direction of the impeller is disposed on a distal end portion of the outer duct, an inner flange disposed on the distal end portion of the inner duct, wherein the inner flange extends in the radial direction of the impeller and has one or more through holes, and the inner flange is fixed to the outer flange.

2. The turbine according to claim 1, wherein an outer opening portion is formed on a base end portion of the outer duct to be connected to an inner peripheral surface of the outflow portion, an inner opening portion is formed on a base end portion of the inner duct to be connected to a flow passage formed inside the inner duct and opposed to the outer opening portion in a state where the inner flange is fixed to the outer flange, and a gap is formed between the outer opening portion and the inner opening portion in a state where the inner flange is fixed to the outer flange and the outflow portion and the inner duct are at a room temperature.

3. The turbine according to claim 2, wherein an inner diameter of the inner duct on an inner opening portion side is slightly larger than an inner diameter of the outflow portion on an outer opening portion side in the state where the inner flange is fixed to the outer flange and the outflow portion and the inner duct are at the room temperature.

4. The turbine according to claim 1, wherein a divergent angle between an inlet and an outlet of a flow passage formed inside the inner duct is in a range of 8 degrees to 30 degrees.

5. The turbine according to claim 1, wherein a divergent angle between an inlet and an outlet of a flow passage formed inside the inner duct is in a range of 8 degrees to 30 degrees.

* * * * *